UNITED STATES PATENT OFFICE.

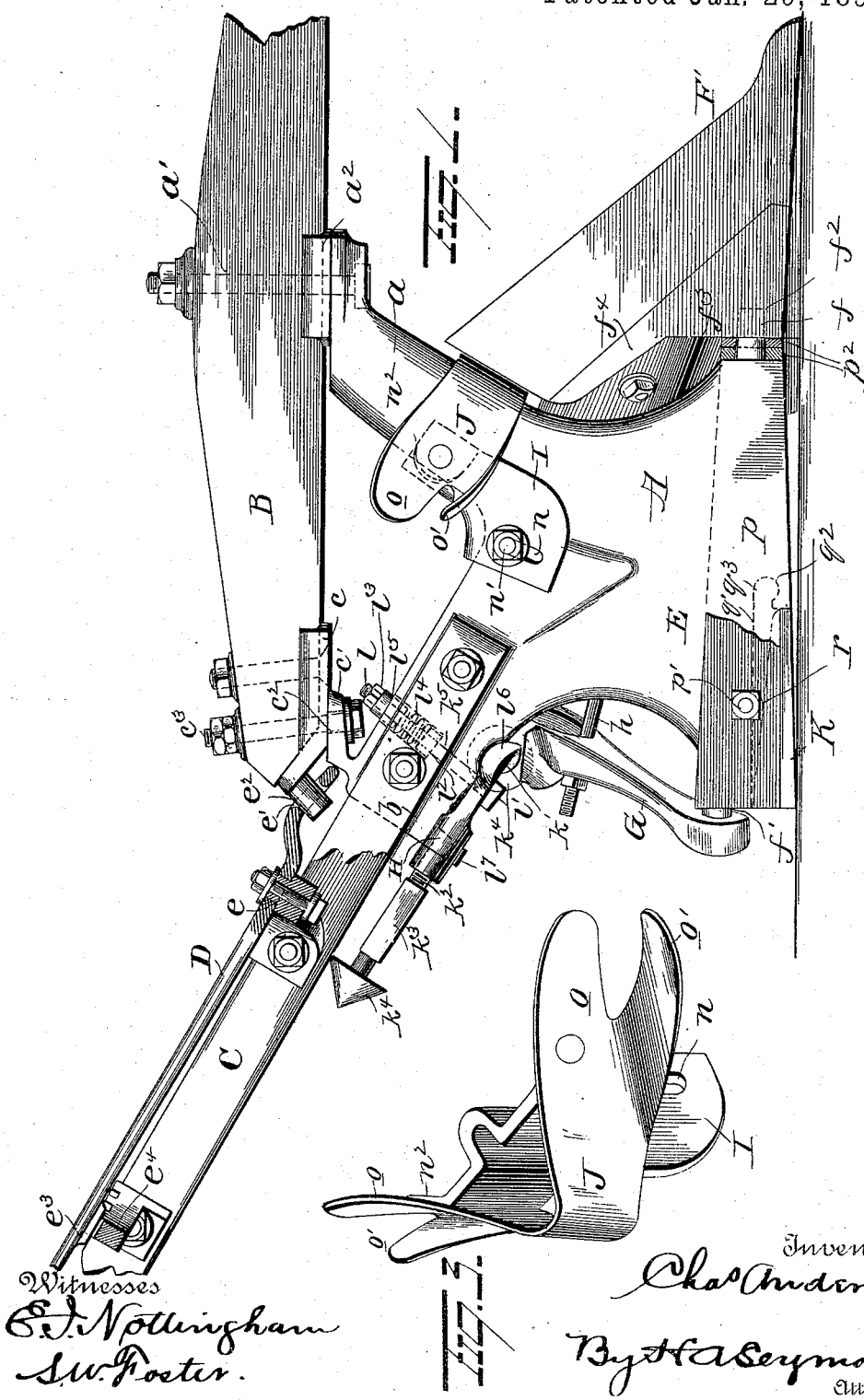

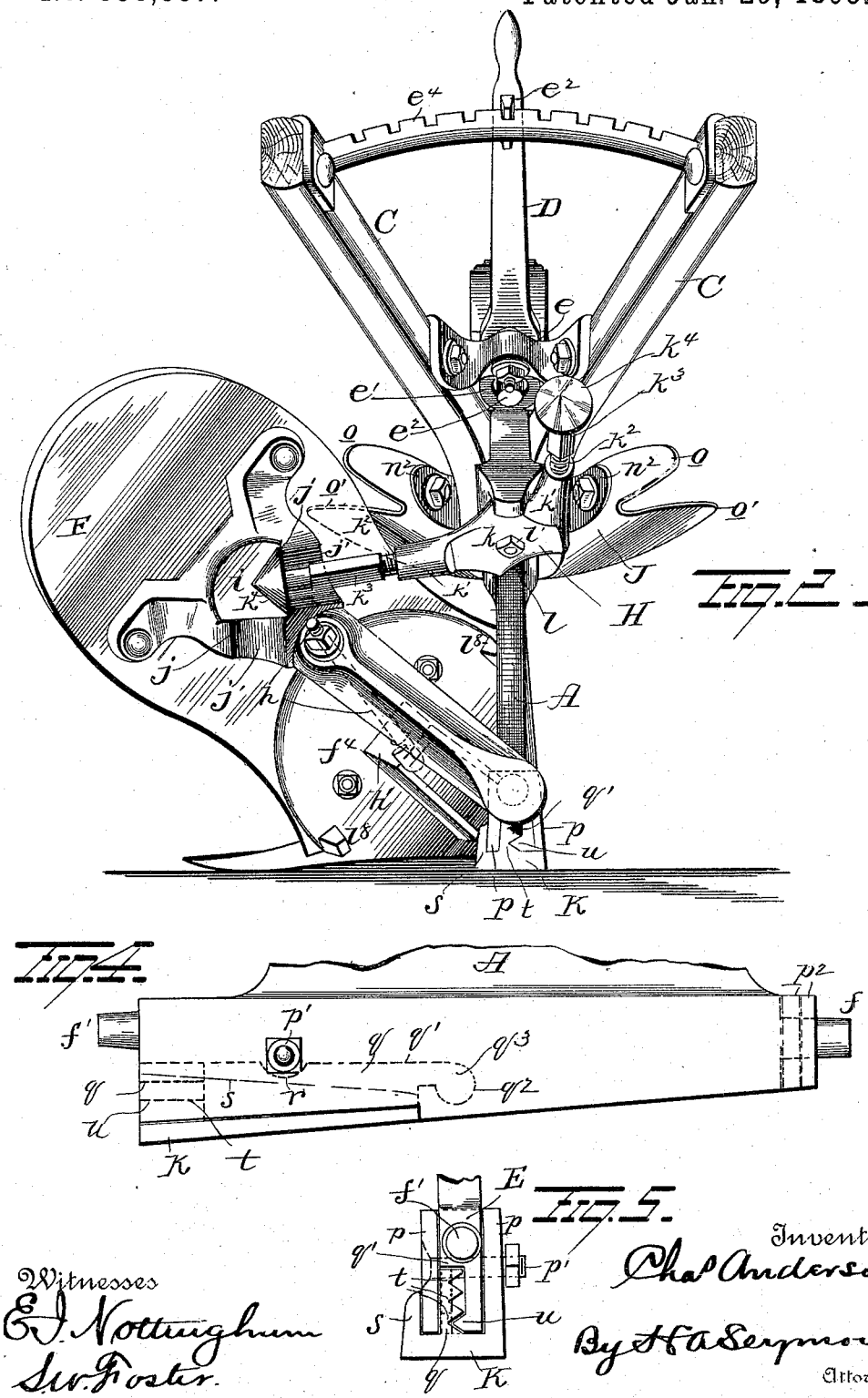

CHARLES ANDERSON, OF SOUTH BEND, INDIANA, ASSIGNOR TO THE SOUTH BEND IRON WORKS, OF SAME PLACE.

SIDE-HILL PLOW.

SPECIFICATION forming part of Letters Patent No. 533,337, dated January 29, 1895.

Application filed June 20, 1894. Serial No. 515,188. (No model.)

*To all whom it may concern:*

Be it known that I, CHARLES ANDERSON, a resident of South Bend, in the county of St. Joseph and State of Indiana, have invented certain new and useful Improvements in Side-Hill Plows; and I do hereby declare the following to be a full, clear, and exact description of the invention, such as will enable others skilled in the art to which it appertains to make and use the same.

My invention relates to an improvement in plows and more particularly to such as are known in the art as side hill plows, the object of the invention being to provide a plow of the class specified with a jointer or skimmer which shall be easy to adjust vertically.

A further object is to construct the jointer or skimmer in such manner that it will be always in working position and thus avoid the necessity of shifting its position when the share and mold board are moved from one side to the other of the beam.

A further object is to so construct the jointer or skimmer that it will operate effectually to cut out the sod corner of the furrow slice and deposit the slice into the bottom of the furrow.

A further object is to produce latch devices for a hill-side or reversible plow, which shall be simple in construction and extensible.

With these objects in view the invention consists in certain novel features of construction and combinations and arrangements of parts as hereinafter set forth and pointed out in the claims.

In the accompanying drawings: Figure 1 is an elevation partly in section of a plow embodying my improvements. Fig. 2 is an end elevation. Figs. 3, 4 and 5 are detail views.

A represents a plow standard having a forward arm $a$ and a rearwardly projecting arm $b$. To the forward arm $a$ of the standard, the beam B is pivotally connected by means of a bolt $a'$, a flanged plate or clip $a^2$ being disposed between the arm $a$ and the beam. A plate $c$ is secured to the rear end of the beam B and normally rests on an arm $c'$, projecting from the rear arm $b$ of the standard. A bolt $c^3$ passes through the beam B and plate $c$ and loosely through the elongated slot $c^2$ in the arm $c'$, said bolt being provided at its respective ends with suitable nuts and washers.

The handles C of the plow are secured to the rear arm $b$ of the standard and between said handles a cross bar $e$ is secured, to which cross bar a lever D is pivoted at a point between its ends. The lower end of the lever D is made with an elongated slot or perforation $e'$, into which a pin $e^2$ projecting from the plate $c$ enters. The lever D is also provided with a tooth $e^3$ adapted to enter one or another of the notches of a notched segment $e^4$ secured between the handles C and thus normally retain the beam B in the position to which it may be adjusted. The purpose of the lever D and its connection with the beam is to provide simple and efficient means whereby to turn the latter when the share and mold-board are shifted from one to the other side of the beam as hereinafter explained, and thus properly regulate the draft of the plow.

From the respective ends of the landside E, pintles $f, f'$ project, the pintle $f$ being adapted to enter a socket $f^2$ made in a shoulder $f^3$ on a plate $f^4$, the mold-board F and the share F' being secured to said plate by means of suitable bolts.

The pintle $f'$ at the rear end of the landside enters a socket in the lower end of an arm G, the other end of which is securely bolted to the mold-board. A perforation is made in the arm G for the accommodation of a tie rod $h$, one end of which is screw threaded for the reception of a suitable nut. The other end of the tie rod is made hook-shaped and passed through a perforation in a flange $h'$ projecting from the plate $f^4$. The upper portion of the arm G is enlarged and made with a perforation $i$ whereby to produce two shoulders $j, j$, to be engaged by a latch device H for retaining the moldboard and share at one or the other side of the beam,—the arm G being made with grooves $j'$ whereby to properly guide the heads of said latch device to the shoulders $j$.

The latch device comprises a plate $k$ having two arms $k'$, and each of said arms is made with a screw threaded socket for the reception of the screw threaded shanks $k^2$ of adjustable arms $k^3$, the ends of said adjustable arms being provided with conical heads $k^4$ adapted to engage one or the other of the shoulders $j$ of the arm G. The plate $k$ is provided at its center with a perforation for the accommodation of a rod or bolt $l$ having a head $l'$ at one end, said rod or bolt being adapted to pass through a perforation $k^5$ in the rear arm $b$ of the standard and at its upper end is screw threaded for the reception of a suitable nut, $l^3$. The upper portion of the perforation $k^5$ is made larger than the lower portion to produce a shoulder on which a collar $l^2$ inserted in said perforation rests. A coiled spring $l^4$ is inserted in said perforation and encircles the rod or bolt $l$, said spring resting at its lower end against the collar $l^2$ and at its upper end against a collar $l^5$ which encircles the rod or bolt under the nut $l^3$. The latch device thus constructed is retained in the position to which it is set to retain the mold board and share to one or the other side of the beam, by the engagement of shoulders $l^6$ projecting from the plate $k$ with the rear arm $b$ of the standard, the spring $l^4$ tending to normally retain said shoulders in such engagement with the arm $b$. The movement of the latch device in one direction or the other is limited by an arm $l^7$ depending from the rear end of the arm $b$.

By constructing the latch device as above described it can be readily set to retain the mold board and share at either side of the beam and can be easily adjusted to accommodate mold boards of various sizes. When the mold board and share shall have been released from the latch device it can be readily turned on the pintles $f$, $f'$ from one to the other side of the beam and will be prevented from being moved too far by the engagement of lugs $l^8$ projecting from the plate $f^4$ with the standard A.

A bracket I is made to straddle the upper portion of the standard A between the arms $a$, $b$, and said bracket is made with a vertical elongated slot $n$ through which a bolt $n'$ passes, said bolt also passing through a perforation in the standard, thus permitting the vertical adjustment of said bracket. The bracket, I, extends upwardly from the intermediate portion of the standard and is made to receive the rear edge of the arm $a$ of the standard, and from said upwardly projecting portion lateral arms $n^2$ project.

To the laterally projecting arms $n^2$ a jointer or skimmer J is secured, said jointer or skimmer being made to pass around the front edge of the arm $a$ of the standard and make contact therewith. The jointer or skimmer J is made with two wings $o$, $o$, one at each side of the standard, and each wing is made with a curved finger $o'$. When the plow is in operation, the jointer or skimmer will cut the sod corner of the furrow slice and by the peculiar shape of the wings and fingers constituting said jointer or skimmer the furrow slice will be deposited down into the bottom of the furrow made by the plow. By providing a double winged jointer or skimmer, it will not be necessary to adjust it when the mold board and share are turned from one to the other side of the beam, the skimmer being always in position for work, regardless of the side of the beam at which the mold board and share are disposed, but said jointer or skimmer can be readily adjusted vertically relatively to the mold board and share when such adjustment is necessary or desirable, by simply moving the bracket I up or down.

The landside of the plow is provided at each side with face plates $p$, $p$, secured in place by means of a bolt $p'$, each face plate being provided with a shoulder $p^2$ at one end, said shoulders being adapted to lie parallel with the forward end of the landside and having perforations for the passage of the pintle $f$. The bottom of the landside and the bottom edges of the face plates, at their rear ends, are recessed for the accommodation of an adjustable heel K and said heel is provided with a flange $q$ which projects upwardly within a recess $q'$ in one side of the landside, said flange lying parallel with the adjacent face plate.

The forward end of the flange $q$ is made with a head $q^3$ having a curved periphery, adapted to enter a similarly shaped recess $q^2$ in the side of the land side, said recess $q^2$ being contiguous with the recess $q'$. By thus connecting the heel piece K with the landside, the rear end of said heel can be lowered when desired or necessary, the hinged connection of the heel piece with the landside permitting such adjustment. By providing the heel with the head $q^3$ the longitudinal movement of said heel will be prevented, but to insure against any possible longitudinal movement of the heel and to relieve the hinged connection thereof with the landside from strain, the bolt $p'$ is made to pass through a recess $r$ made in the upper edge of the flange $q$ of said heel.

The heel K is provided with a flange $s$ adapted to lie parallel with one of the face plates $p$, and the face of the flange $q$ opposite to the flange $s$ is provided with a series of grooves $t$ for the reception of a rib or tooth $u$ projecting from the landside. In this manner the heel K can be rigidly held at any desired adjustment.

The object of my improved adjustable heel K is to provide for the wear at the heel of the landside and point of the share and by regulating the adjustable heel K the proper suction of the share is always maintained and the plowing done with uniformly good results.

My improvements are simple in construction and combine to produce a hill-side plow which will be effectual, in all respects, in the performance of its functions.

Slight changes might be made in the details of construction of my invention without departing from the spirit thereof or limiting its scope and hence I do not wish to limit myself to the precise details of construction herein set forth, but, Having fully described my invention, what

I claim as new, and desire to secure by Letters Patent, is—

1. The combination with a plow standard, of a jointer or skimmer secured thereto, said jointer or skimmer comprising two wings, one at each side of said standards and curved fingers projecting from said wings, substantially as set forth.

2. The combination with a plow standard, of a double jointer and bracket secured together and surrounding the standard and embracing the latter so as to prevent lateral turning on the standard, substantially as set forth.

3. The combination with a plow standard, of a double jointer, and a bracket secured to this jointer in two places, the two surrounding the standard when together, and means for adjusting the jointer vertically on the standard, substantially as set forth.

4. The combination with a plow standard, and landside, of a double jointer, and a bracket secured to the jointer in two places and the two surrounding the standard, said bracket having approximately vertical slot, and means passing through the slot into the landside whereby to effect an adjustment of the jointer.

5. The combination with a plow standard, a landside and a rearwardly projecting arm, said standard and arm diverging from each other at an angle whereby a crotch is formed at their point of union, of a double jointer, and a bracket secured to the jointer at two points with the standard between them, said bracket normally seated in the crotch between the standard and the arm, substantially as set forth.

6. The combination with a plow standard having a forward upwardly projecting arm, of a bracket adjustably secured to said standard in rear of said arm, and a skimmer or jointer secured to said bracket and adapted to bear against the forward edge of said arm, said skimmer or jointer comprising two wings projecting outwardly from opposite sides of the standard, substantially as set forth.

7. The combination with a reversible plow, of a latch device connected to the standard of said plow and having conical heads adapted to engage an arm connected with the mold board, whereby to retain the latter in position, substantially as set forth.

8. The combination with a reversible plow, of a latch device having extensible arms with tapering or cone shaped ends whereby they are operative in any changed axial position, substantially as set forth.

9. The combination with a reversible plow, of a latch device comprising a plate pivoted to a part of the plow and arms having screw threaded inner ends adapted to turn into threaded sockets in the plate whereby these arms are rendered extensible, and the outer ends of the arms tapering and having an engaging shoulder formed inside and adjacent to the taper, substantially as set forth.

10. The combination with a reversible plow, of a latch device comprising a plate pivotally connected to the standard and having socketed arms, arms provided at one end with heads or enlargements and at their other ends with screw-threaded shanks to enter said socketed arms, substantially as set forth.

11. The combination with a reversible plow, of a latch device comprising a plate having socketed arms, pivotally connected with the standard, arms having conical heads at one end and screw threaded shanks at the other end to enter said socketed arms and means for retaining said latch device in the position to which it is adjusted, substantially as set forth.

12. In a plow, the combination with a reversible mold board, of a latch device comprising a plate having a pair of integral arms, and extensible sections having conical ends and angular portions whereby to receive an instrument whereby they are turned to lengthen or shorten the arms of the latch, substantially as set forth.

13. In a reversible plow, the combination with a standard, a land side and a share and mold board secured together and pivotally connected at one end to the land-side, of an arm secured at one end to the mold board and pivotally connected at the other end to the land-side, said arm having two shoulders thereon and grooves contiguous with said shoulders, and a latch device pivotally connected to the plow standard and having conical heads adapted to engage one or the other of said shoulders and be guided thereto by said grooves, substantially as set forth.

14. In a plow, the combination with a land side having a pintle at the forward end and a reversible mold board mounted to turn on said pintle, of a pair of face plates held at their forward ends by this pintle said face plates facing the two sides of the mold board, and means for passing their rear ends to the landside, substantially as set forth.

15. In a plow, the combination with a landside having a pintle at each end, and reversible mold-board mounted to turn on said pintles, of face plates the lower edges of which are flush with the lower edge of the landside and the forward ends having lateral projections mounted on the forwardly projecting pintle, and securing these face plates to the land side, substantially as set forth.

16. In a plow, the combination with a land side having a recessed rear end, one end of the recess being rounded to form a bearing socket, of a heel removably connected with the landside having a portion which fits in the recess in the landside and a rounded end which fits and is adapted to turn in the bearing socket, and means for adjusting the heel, substantially as set forth.

17. In a plow, the combination with a landside, having a recessed rear end and a rounded bearing socket in the forward end of the recess, of a removable heel having a rounded end adapted to fit and turn in the bearing socket, means for adjusting the rear end of the heel to different heights, the heel having a notched upper edge and a removable bolt adapted to pass through the landside and notch whereby to assist in holding the heel in place, substantially as set forth.

18. In a plow, the combination with a landside, having a socket therein, and face plates, the lower edges of which are flush with the lower edge of the landside and face plate having a notched rear lower end, of a heel adapted to fill the notched out portion of the landside and face plates and form a vertically adjustable bottom for the landside, and heel provided with a flange which enters between the face plates and means for securing the flange, face plates and landside together, substantially as set forth.

In testimony whereof I have signed this specification in the presence of two subscribing witnesses.

CHARLES ANDERSON.

Witnesses:
M. M. MATTHEWS,
JNO. W. HARBON.